United States Patent [19]

Diggins

[11] 4,333,088
[45] Jun. 1, 1982

[54] DISPOSABLE PERISTALTIC PUMP ASSEMBLY FOR FACSIMILE PRINTER

[75] Inventor: Martin J. Diggins, Newtown, Conn.

[73] Assignee: Exxon Research & Engineering Co., Florham Park, N.J.

[21] Appl. No.: 203,589

[22] Filed: Nov. 3, 1980

[51] Int. Cl.³ .............................. G01D 15/18
[52] U.S. Cl. ................... 346/140 R; 358/296; 417/412; 417/475; 417/477
[58] Field of Search ............ 346/140 R, 75; 358/296; 417/477, 475, 412

[56] References Cited

U.S. PATENT DOCUMENTS

| | | | |
|---|---|---|---|
| 2,693,766 | 11/1954 | Seyler | 103/149 |
| 2,917,002 | 12/1959 | Mascaro | 103/149 |
| 3,192,863 | 7/1975 | Vadot | 103/149 |
| 3,431,864 | 3/1969 | Jones, Jr. | 103/149 |
| 3,565,548 | 8/1969 | Muller | 417/477 |
| 3,832,096 | 7/1972 | Gelfand | 417/477 X |
| 3,909,831 | 9/1975 | Marchio | 346/140 |
| 3,945,021 | 3/1976 | Kraus | 346/75 |
| 4,080,113 | 3/1978 | Legeay nee Lechat et al. | 417/477 |
| 4,123,761 | 10/1978 | Kimura | 346/140 R |
| 4,131,399 | 12/1978 | Calvet | 417/477 |
| 4,170,016 | 10/1979 | Geil | 345/140 R |
| 4,241,357 | 12/1980 | Anestos | 346/140 R |

*Primary Examiner*—Joseph W. Hartary
*Attorney, Agent, or Firm*—Norman L. Norris

[57] ABSTRACT

Facsimile transceiver apparatus for operating in both transmission and reception modes is disclosed which features a disposable ink jet printer apparatus comprising a reservoir, dual peristaltic pumps for supplying of ink to the jet for priming and purging and for supplying a vacuum to the vicinity of the orifice of the jet for catching any purged material and the jet itself is disclosed. The pumps are peristaltic pumps of the type in which resilient tubes are progressively compressed along their axial length whereby a pressure differential is produced across the ends of the tubes. A first such pump is used to provide priming and purging ink to the jet and a second is used to provide a vacuum in the vicinity of the orifice of the jet. The entire assembly is unitary and self-contained so as to be readily replaceable in the event of any difficulty with its operation or of the consumption of all the ink contained within the reservoir.

22 Claims, 13 Drawing Figures

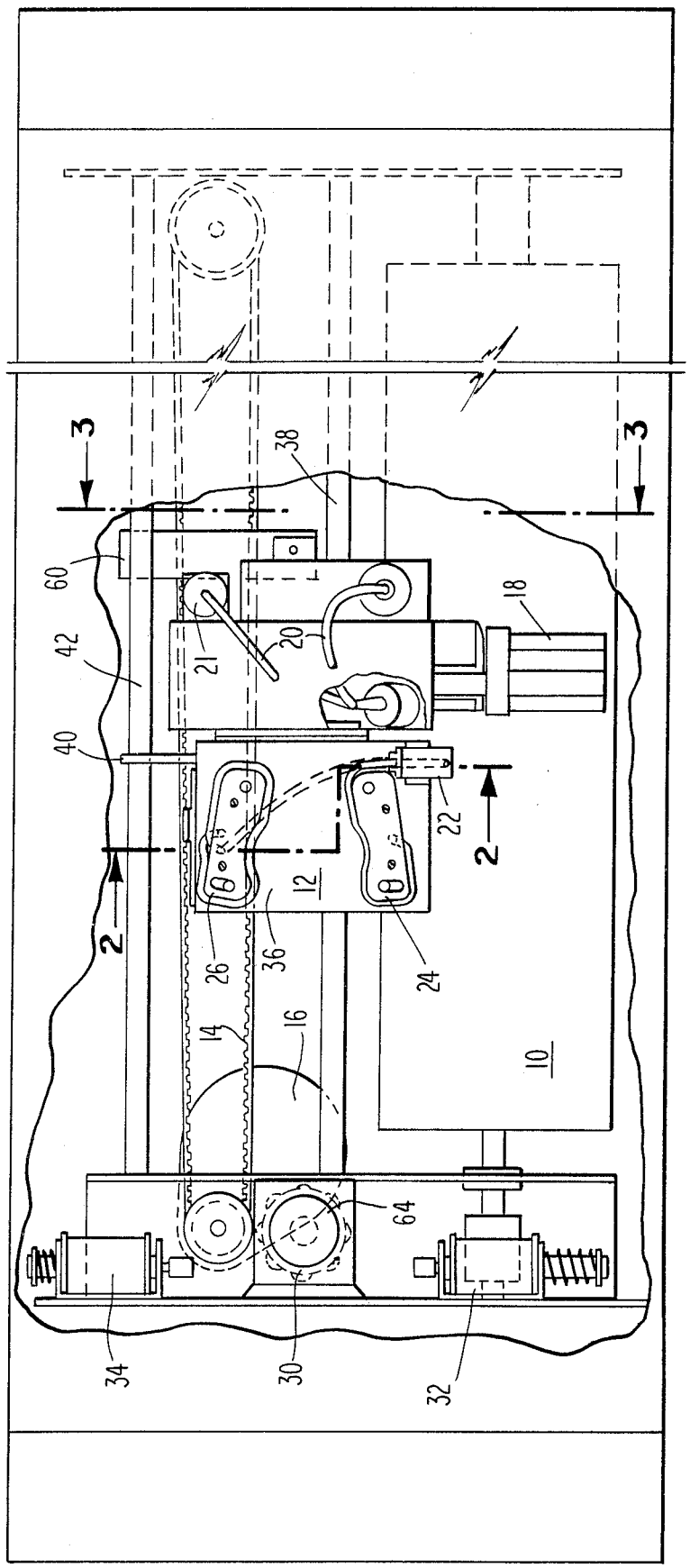

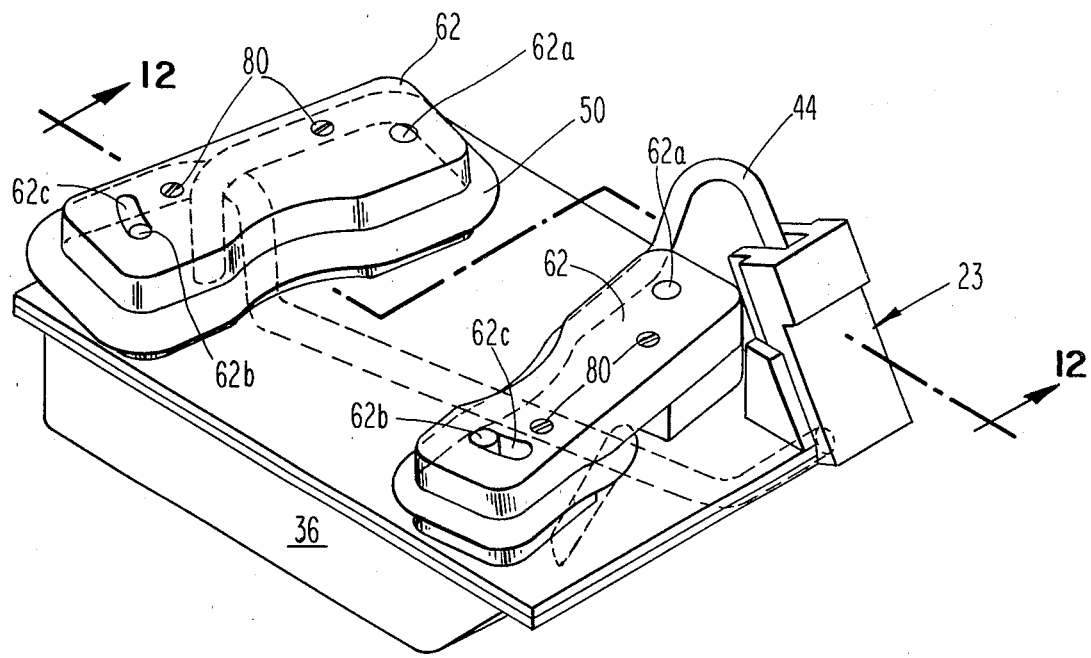
_Fig. 11_
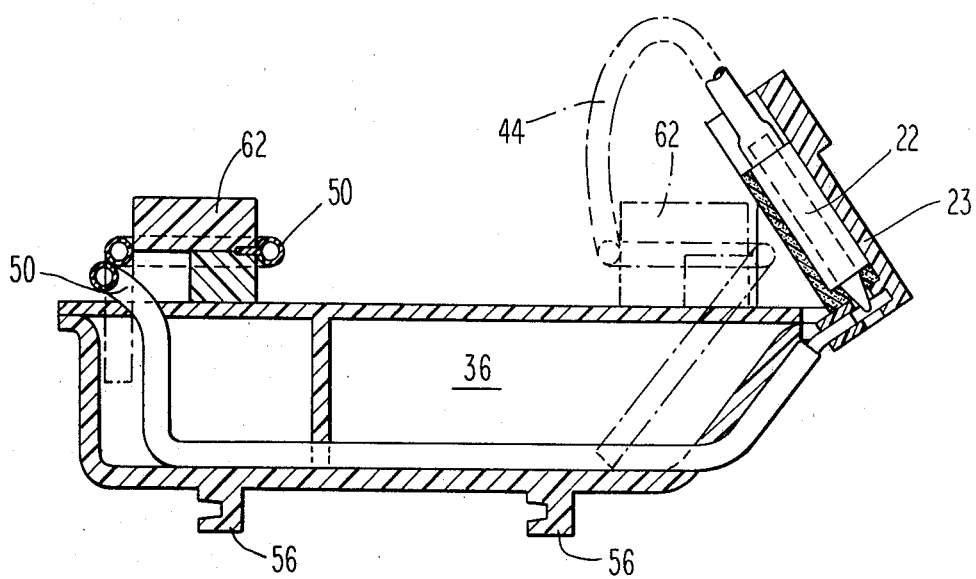
_Fig. 12_

DISPOSABLE PERISTALTIC PUMP ASSEMBLY FOR FACSIMILE PRINTER

FIELD OF THE INVENTION

The present invention relates to the art of facsimile transceiver apparatus wherein a received signal is demodulated and used to reproduce a document being scanned at a remote location by a printer, in this case comprising an ink jet supplied with ink from a disposable reservoir comprising disposable peristaltic pump apparatus.

BACKGROUND OF THE INVENTION

For many years it has been known in the art to provide facsimile transceivers which are adapted to scan a document at a first location and transmit a signal representative of dark/light variations in that document over a link such as, typically, a telephone line, and to receive such signals, demodulate them, and print out a facsimile of the document scanned by a similar transceiver at a remote location. In the prior art, such facsimile transceivers have typically printed by electrostatically "burning" a specially prepared paper to produce dark/light variations on the surface of the paper. However, such papers are expensive and additionally cause pollution in the atmosphere due to their burning of the surface of the paper and, hence, it has been a need of the art to replace such electrostatic burning printing methods with other methods, in particular other methods not requiring expensive specially treated papers.

To this end, it has been known in the art to provide an ink jet printer apparatus according to which a stream of ink droplets are emitted from an orifice in response to the received signals. Several different types of ink jet apparatus have been proposed. Chief among these are ones in which a continuous stream of drops is emitted from the orifice of the ink jet, those droplets not required for printing being electrostatically deflected and typically recycled for re-emission. Another type of ink jet apparatus is the "impulse" type, in which the ink droplets are emitted only in response to print commands. The present invention has applicability to both types, but in a preferred embodiment relates to the impulse type of jet.

It will be appreciated by those skilled in the art that the typical document to be transmitted by a facsimile transceiver is a typed or otherwise printed document which typically comprises only about 5% to 10% printing, the remainder being white paper. Therefore, if a continuous stream type of ink jet printer is to be used, in order to provide efficient use of ink, all the ink not required for printing must be efficiently caught, after having been deflected, and recycled. This recycling typically involves elaborate filtering, bubble elimination and cleansing and pressurizing schemes. For this reason, at least, it would be desirable to use the "impulse" printing system in which ink droplets are emitted only in response to print commands. Thus the ink recycle and associated filtering and bubble elimination apparatus can be eliminated simplifying the assembly immensely. However, to date there has not been provided in the art a workable impulse ink jet system.

It will also be appreciated by those skilled in the art that if a facsimile apparatus is to be useful in the typical office environment in which skilled personnel are not available to maintain and repair the ink jet apparatus, it must be relatively foolproof. To this end, copending application Ser. No. 203,583, has been filed on Nov. 3, 1980 in the name of K. W. Bower. This invention relates to disposable ink jet printing apparatus comprising the ink jet itself, a reservoir of ink and pump means for supplying the ink to the ink jet for purposes of priming and purging the jet prior to printing, capillary action supplying the ink to the jet thereafter. The invention of Bower comprises the idea that this ink jet apparatus can be made in a unitary assembled way and be manufactured sufficiently inexpensively that the entire assembly can be made disposable, thus eliminating the need for skilled personnel to be available in the environment in which the ink jet facsimile apparatus is to be used. Therefore, if anything goes amiss with the ink jet printer, or if the ink should be consumed, the entire assembly can be readily removed and disposed of and replaced by essentially unskilled personnel. This offers the additional advantage that the ink jet may be connected to the reservoir at the point of manufacture therefore eliminating the necessity of elaborate connection means which has occupied numerous inventors in the prior art. The invention of Bower also includes the broad concept of dividing various pump functions among disposable and nondisposable parts of the apparatus, thus lowering the cost of the disposable portions.

A second related application is that assigned Ser. No. 203,584, filed Nov. 3, 1980, in the name of W. Salmre. In that application, it is disclosed that the pumps of the Bower invention can most advantageously be made by using the "peristaltic" pumping principle in which a resilient tube is progressively compressed along its axial direction so that a pressure differential is produced across its ends. This inexpensive valveless pumping apparatus can be used to supply ink to the jet for priming and purging purposes. The present invention relates to a practical commercial preferred embodiment of both the Bower and Salmre inventions. That is, it comprises peristaltic pumping means for use in conjunction with disposable ink jets and reservoirs of ink for use, in particular, in facsimile apparatus, though applicable to other forms of ink jet printing machinery.

OBJECTS OF THE INVENTION

In accordance with the discussion above, it will be appreciated that a primary object of the invention is to provide a disposable pump means which is sufficiently inexpensive as to be disposable, in combination with an ink jet and a reservoir of ink.

A further object of the invention is to provide a readily assembled reservoir, pump and ink jet combination.

A further object of the invention is to provide an inexpensive pump wherein the motive power for the pump is provided by non-disposable means interacting with disposable pump means which can be fixedly connected to an ink jet and to a reservoir of ink at the point of manufacture whereby these connections do not have to be made in the field.

Finally, an ultimate object of the invention is to provide an improved facsimile apparatus.

SUMMARY OF THE INVENTION

The above needs of the art and objects of the invention are satisfied by the present invention which comprises dual peristaltic pumps, one for supply of ink to an ink jet for purposes of priming and purging the jet and another for supplying vacuum to the vicinity of the orifice of the jet whereby subatmospheric pressure is produced in this vicinity for catching any debris or purge ink emitted by the jet during priming and purging operations, in accordance with the invention of Bower as discussed above. The two pumps in the preferred embodiment are peristaltic pumps of the type in which a plurality of rollers progressively compresses the tube against a tube block, thus producing a pressure differential along its length. The pressure differential is used in the prime/purge pump to supply ink to the ink jet and in the vacuum pump to supply reduced pressure to the vicinity of the jet. Both pumps are powered by a single motor mounted on the facsimile apparatus and are energized by individual solenoids, also mounted on the apparatus. Operation of the solenoids is individually timed for precise control of ink supply and suction. Accordingly, the expensive motor and solenoids are not disposable whereas the pumps themselves are. In this way, unskilled office personnel can readily replace the ink jet comprising the reservoir, the jet and the pumps, the assembly being made sufficiently inexpensively that such consumability is economically feasible.

BRIEF DESCRIPTION OF THE DRAWINGS

The invention will be better understood if reference is made to the accompanying drawings in which:

FIG. 1 represents a plan view of a facsimile apparatus comprising ink jet printing apparatus according to the invention;

FIG. 11 is an assembled view corresponding to FIG. 10; and

FIG. 12 is a cross-section of the pump apparatus of the invention taken along the line 12—12 of FIG. 11.

DESCRIPTION OF THE PREFERRED EMBODIMENTS

Figure 3:
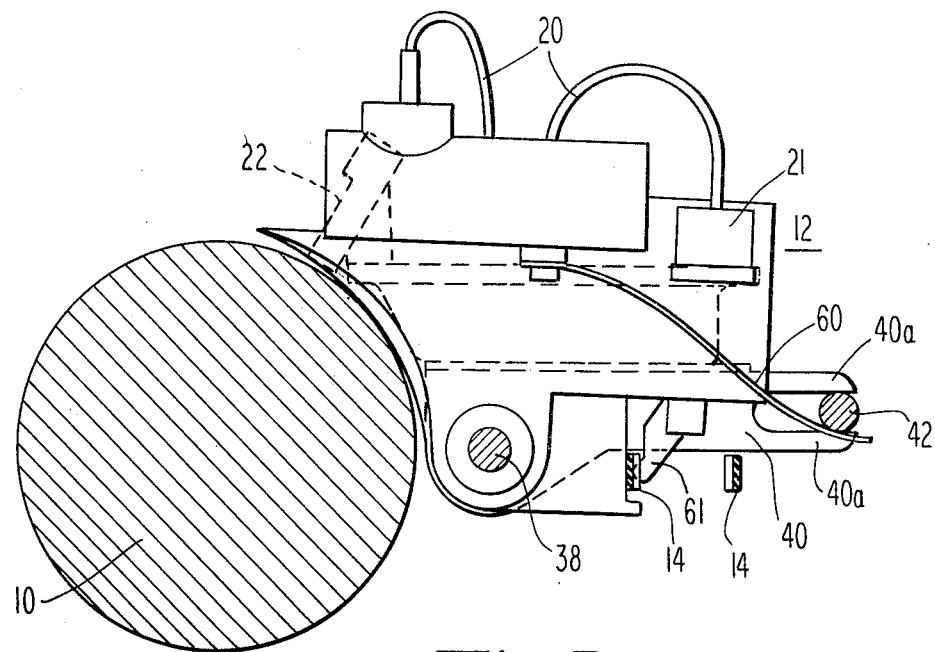
FIG. 3 represents a second cross-sectional view of the facsimile apparatus of the invention taken along the line 3—3 of FIG. 1.

Referring now to FIG. 1, an overall plan view is shown of a facsimile transceiver comprising ink jet apparatus embodying the invention. In broad terms, the facsimile transceiver typically comprises a drum such as shown at 10 in FIG. 1 which is rotated by a motor 11 shown in FIG. 4 while a read/write head generally indicated at 12 moves or scans in a direction parallel to the axis of the drum thus covering the whole expanse of a copy medium or a piece of paper supported by or wrapped around the drum 10. In the embodiment shown, the head 12 is moved axially with respect to the drum 10 by means of a toothed belt 14 driven by a motor 16. The head 12 may be attached to the belt by a clamp which will be subsequently described.

The head 12 includes a knob 18 which controls the head function or mode; i.e., reading or writing. In the reading mode, fiber optics 20 provide a source of illumination for a document and pick up dark/light variations in the document. The dark/light variations in the document are used to generate signals which are modulated and transmitted to a remote receiver at a distance.

The present invention relates to the printing apparatus which comprises an ink jet 22, peristaltic pumps 24 and 26 and a reservoir of ink 36. Prior to operation of the apparatus, that is, prior to reception of a document, the jet 22 must be primed and purged, i.e., be filled with ink and have any debris on its orifice removed. This can preferably be done by supplying the ink under pressure generated by pump 24 until the ink jet 22 is full of ink. Thereafter any ink emitted from the orifice of the jet 22 is replaced by capillary action, the diameter of the jet 22 and associated tubes and the viscosity and surface tension of the ink being so chosen that this capillarity is available. A vacuum is provided in the vicinity of the jet 22 by a second peristaltic pump 26 in order to remove any ink emitted from the jet during the prime/purge operation discussed above and any debris which may have been removed from the jet by the prime/purge operation. Both pumps 24 and 26 are driven by a wheel indicated generally at 30 operating in conjunction with a pair of solenoids 32 and 34. The operation of these means will be discussed in further detail below.

Figure 2:
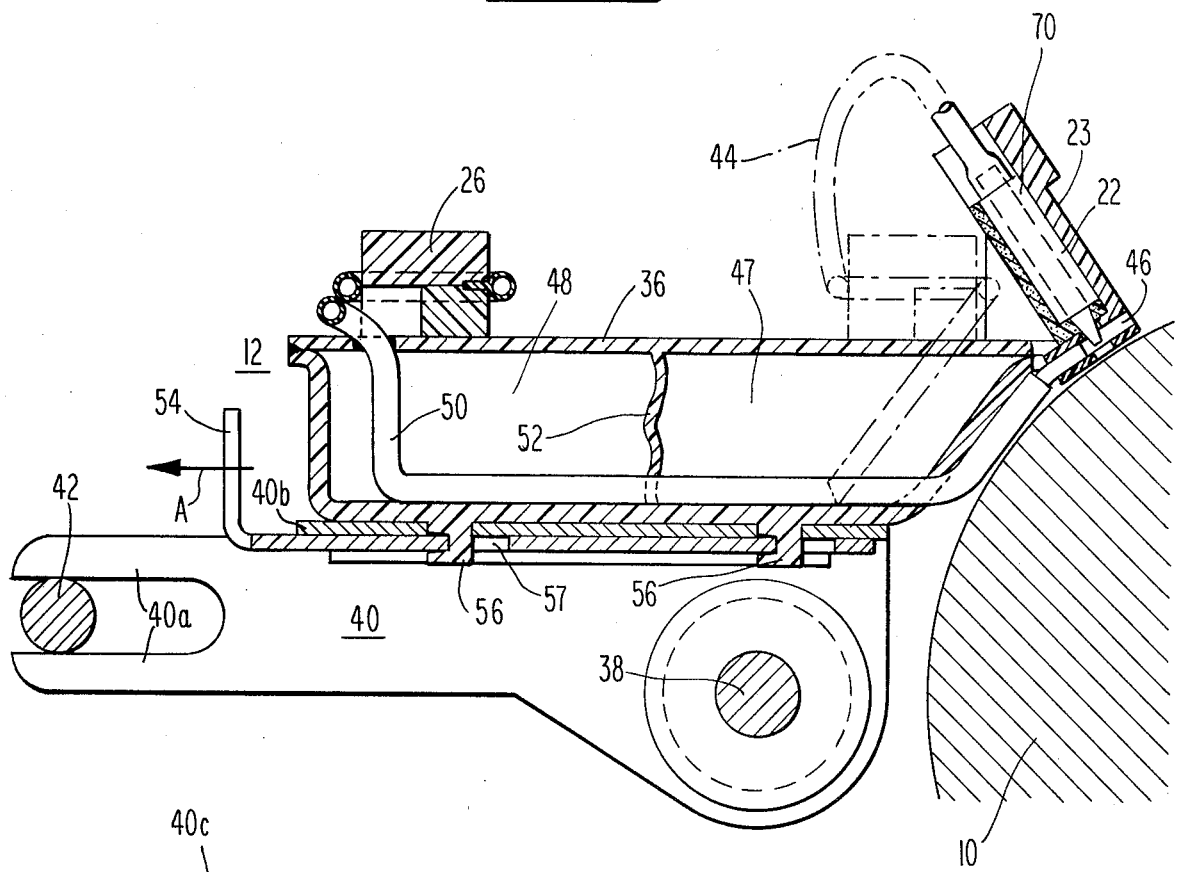
FIG. 2 represents a cross-section of a portion of the facsimile apparatus of FIG. 1 taken along the line 2—2 of FIG. 1.

Referring now to FIG. 2, additional details of the ink jet printer in the facsimile application is disclosed. A portion of the rotating drum 10 is shown in FIG. 2 with the ink jet 22 in close proximity to the drum 10 and hence to a copy medium mounted on the drum. The pump 24, for supplying ink to the jet 22 during prime/purge operation, is shown in phantom and is connected by a tube 44, also in phantom, to the jet 22. In a preferred embodiment, the jet 22 may comprise a glass tube having an inside diameter on the order of 1 to 2½ thousandths of an inch encased by a cylindrically-shaped portion of piezoelectric material adapted 70 to be electrically oriented so that upon supplying of potential to the piezoelectric material, the glass tube is axially compressed whereby a drop of ink is emitted from its orifice. The entire assembly may be potted as shown in FIG. 2 and mounted in a holder 23 which may be molded of a plastic material to accommodate the potting. In a preferred embodiment, the orifice of the jet 22 is surrounded by a region 46 and a vacuum or subatmospheric pressure may be supplied by a peristaltic pump 26 by means of a tube 50 to the region 46 for catching any primed ink or purged debris thus preventing it from being collected on the copy medium.

Figure 2A:
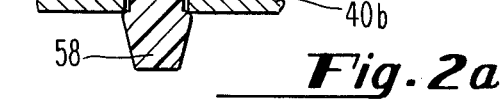
FIG. 2a represents an enlarged view of an alternate embodiment or part of the apparatus shown in FIG. 2.

As shown in FIG. 2, the reservoir 36, upon which are assembled the associated pumps 24 and 26 and the ink jet 22, is mounted upon a bracket indicated generally at 40 which moves back and forth upon a rod 38 as indicated above. The bracket 40 may be formed with yoke arms 40a adapted to engage a second rod 42 thus establishing a precise relationship between the orifice of the jet 22 and a copy medium mounted upon the drum 10. The bracket may also be provided with an angled or eared portions 40b adapted to interact with a slidable holder or bracket 54 which engages pins or stubs 56 which may be formed integrally with the body which forms the reservoir 36. This is discussed in further detail in connection with FIG. 9 below. In this way, by moving of the slidable holder 54 in the direction indicated by the arrow, the notched pins 56 located in openings 57 become detached therefrom and the entire assembly can be readily removed and replaced by another one in the event of trouble or of consumption of all the ink contained within the reservoir 36. FIG. 2a shows an alternate connection scheme in which molded pins 58 may be sized and formed (preferably integrally with the reservoir 36,) of a material of resiliency such that the pins 58 can interact with holes 40c in the bracket 40b, thus allowing simple, finger-pressure mounting of the reservoir 36 to the bracket 40.

As also shown in FIG. 2, the reservoir may be provided with a wall 52 between the supply section 47 and the return section 48 of the reservoir 36. The wall 52 may be flexible so as to accommodate varying quantities of ink on opposite sides of the wall 52.

Referring now to FIG. 3, the other side of the read/write head 12 is shown. FIG. 3 shows the rods 38 and 42 upon which the bracket 40 is mounted, and shows a cross-sectional view of the toothed belt 14 which moves the read/write head 12 back and forth with respect to the drum 10 by means of the clamp 61 which affixes the read/write head 12 to one side of the belt. FIG. 3 also shows a leaf spring 60 which serves to bias the read/write head 12 with respect to the rod 42 thus maintaining it in a precise angular position with respect to rotation about the rod 38, thus controlling the relationship of the orifice of the jet 22 with respect to the drum 10. The fiber optics 20 are also shown as is the photodetector 21 used to generate the signals for transmission when the transceiver according to the invention is operated in a transmit mode.

Figure 4:
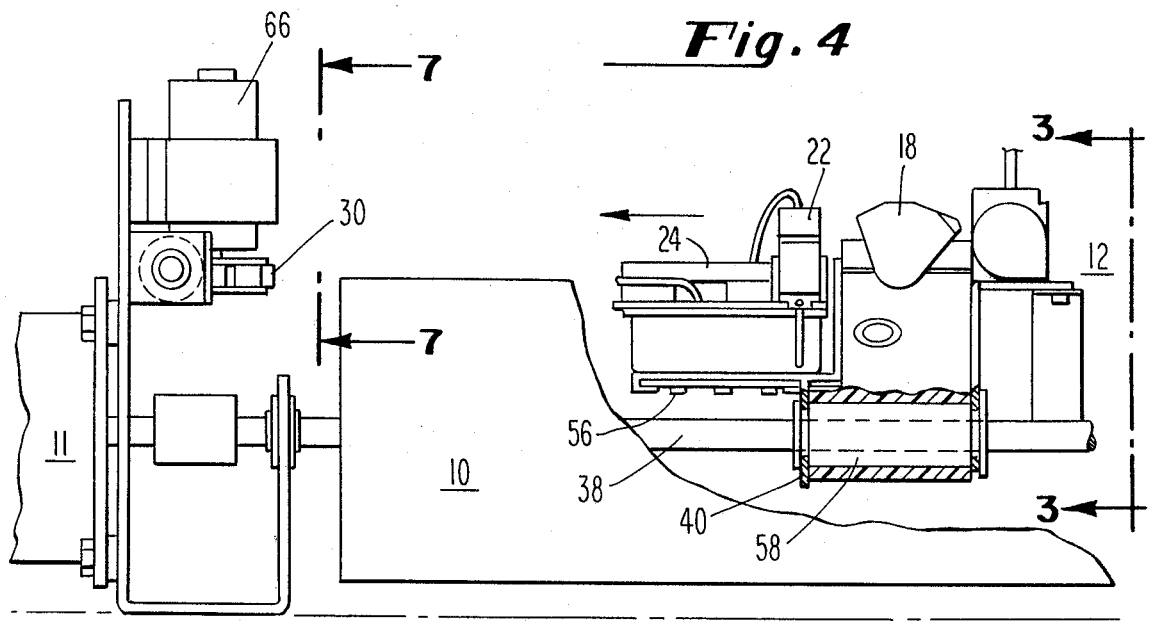
FIG. 4 represents an enlarged side view of the facsimile apparatus of the invention with the front wall of the housing in which the apparatus is contained broken away.

FIG. 4 shows a front view of the facsimile transceiver according to the invention with a portion of its housing (shown in FIG. 1) broken away. This reveals the drum 10 on which a copy medium is mounted for printing, driven by a motor 11, and shows the rod 38 on which the read/write head 12 moves. In the embodiment shown in FIG. 4, the read/write head 12 is mounted on a bracket 40, in turn carried on a bushing 58. The ink jet 22 is shown in FIG. 4 as is the peristaltic pump 24 used to supply ink to the jet 22 for purging and priming purposes. The pump 24, as outlined above, is energized by a motor 64 operating through a roller wheel 30.

Figure 5:
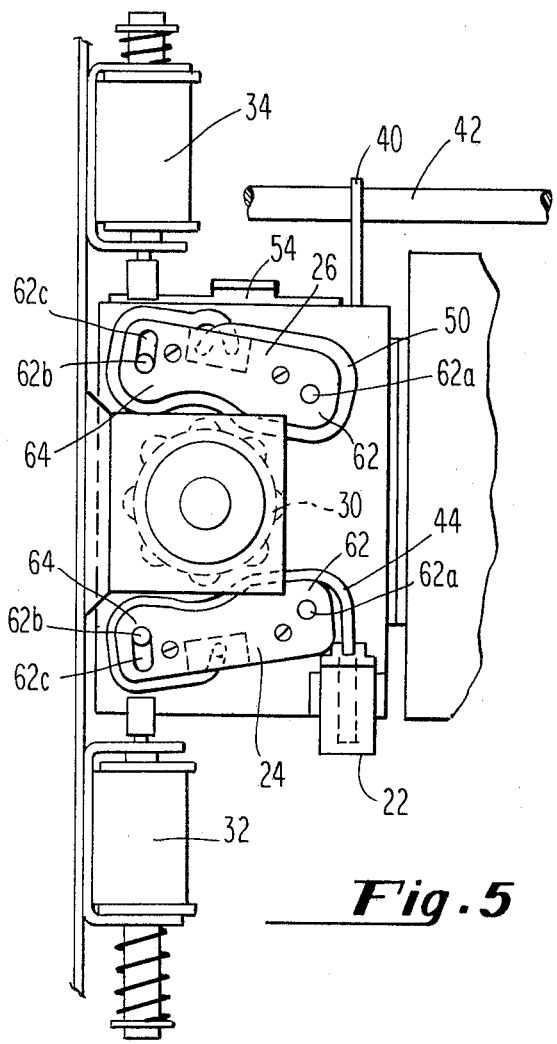
FIG. 5 is an enlarged plan view of the peristaltic pump apparatus of the invention shown in a first operational mode.
Figure 6:
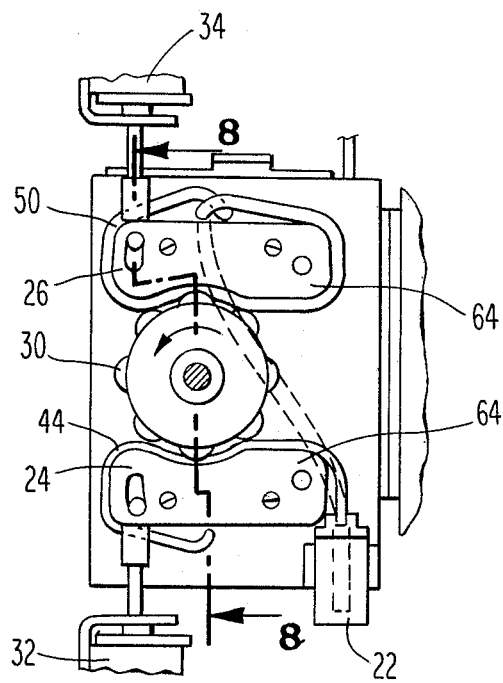
FIG. 6 is a corresponding view of the pump apparatus of the invention in a second operational mode.

Details of the interaction between the roller or pumping wheel 30 and the pumps 24 and 26 are shown in FIGS. 5 and 6. The roller wheel 30, shown in phantom in FIG. 5 and in full in FIG. 6 due to the removal of the bracket on which the motor is carried from FIG. 5, is shown as between the two peristaltic pumps. The peristaltic pumps move back and forth with respect to the read/write head, being disposable and permanently connected to the ink jet 22, the motor being stationary on the frame of the facsimile apparatus according to the invention. In the preferred embodiment, the pumps 24 and 26 may interact with the roller wheel 30 at the left most extremity of the travel of the read/write head 12. Solenoids 32 and 34 which individually energize two peristaltic pumps 24 and 26 by pressing them against the roller wheel 30 are mounted on the facsimile apparatus and are not disposable. In this way, the expense of providing the motor and solenoids is not a part of cost of the replacement of the ink jet apparatus, these parts being relatively expensive. By comparison, using the teachings of the present invention, the peristaltic pumps 24 and 26 themselves can be made from relatively inexpensive plastic materials comprising only valveless plastic tubing and support blocks, as discussed below, and can be disposed of as necessary according to the invention.

As shown by comparison of FIGS. 5 and 6, the hoses or to tubes 44 and 50 of the two pumps 24 and 26 are mounted on tube blocks 62 which are pivoted about pivot points 62a and are located by pins 62b in slots 62c formed in the tube block 62. Thus, if the solenoids 32 and 34 are energized, the tube blocks 62 are pivoted about the pins 62a, and are limited in their motion by the pins 62b interacting with the slot 62c. The hoses or tubes 44 and 50 are thus pushed into the roller wheel 30 by the action of the solenoids 32 and 34 and are substantially closed by the rollers of the roller wheel 30. If the roller wheel 30 is then rotated, the rollers will progressively compress portions of the tubes 44 and 50, thus producing a differential in pressure at the ends of the tubes 44 and 50 which can be used either to provide a positive pressure for, e.g., supplying of ink to the jet 22 for purging and priming purposes, or a negative one for supplying of a vacuum to the annular catcher 46 in the vicinity of the jet 22 for collection of any material primed or purged, depending on the connection of the tubes. FIG. 6, a view presented for comparison with FIG. 5, includes an arrow showing the direction of rotation of the roller wheel 30 used to provide positive pressure in tube 44 as outlined above for priming and purging purposes and a negative one in tube 50 for providing a vacuum to the vicinity of the orifice of the jet 22.

Figure 7:
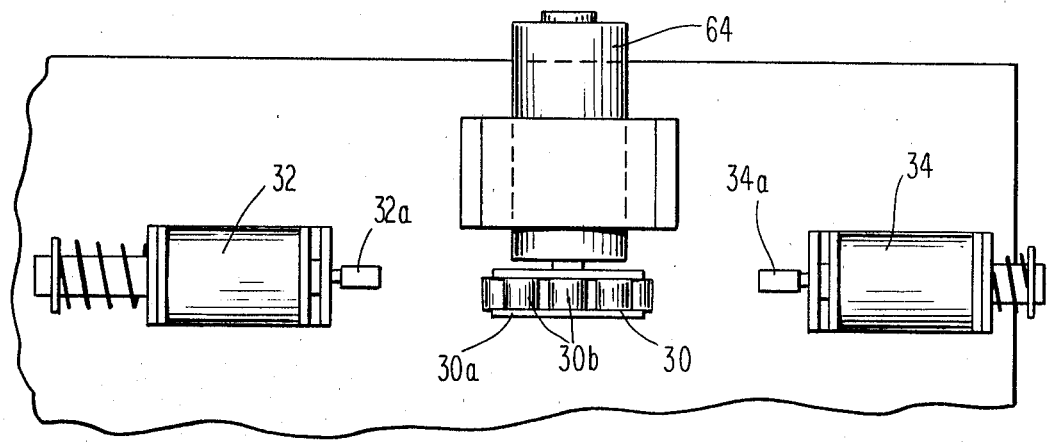
FIG. 7 is a side view of the portion of the pump apparatus according to the invention which is not disposable.
Figure 8:
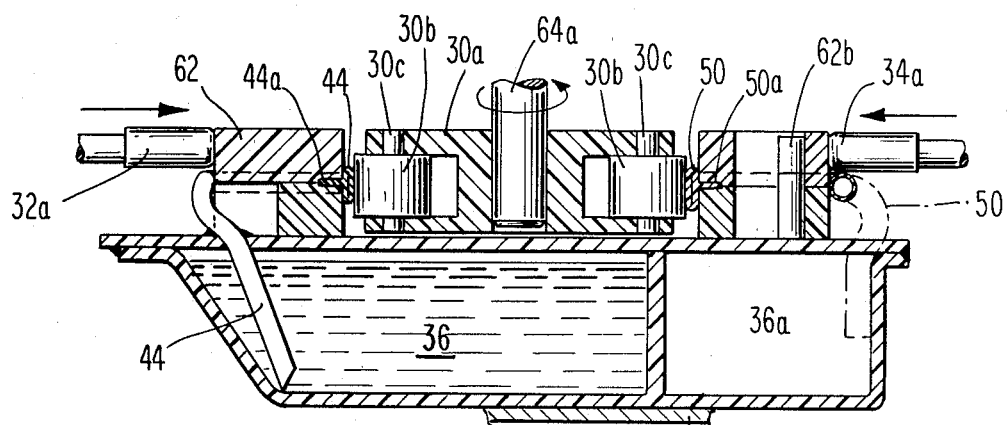
FIG. 8 is a cross-sectional view of the pump apparatus of the invention in operation taken along the line 8—8 of FIG. 6.

Taken together, FIGS. 7 and 8 show details of the pumping apparatus including that mounted permanently on the facsimile apparatus and not disposable which is shown in FIG. 7, while FIG. 8 provides an enlarged view showing how the roller wheel 30 interacts with the two tubes 44 and 50 to provide the desired pumping action. As shown, the roller wheel 30 comprises a plurality of rollers 30b mounted in a hub 30a, which may as shown in FIG. 8 be of unitary molded construction. The rollers 30b rotate individually on pins 30c. In this way, no net force in the linear direction is exerted on the tubes 44 and 50 along their axes so that they are permitted to remain stationary with respect to the tube blocks 62. To ensure that they do so, the tubes 44 and 50 may be provided with molded-in ribs 44a and 50a. To this end, the tube blocks 62 may each be formed of two sections which combine to clamp the ribs 44a and 55a of the tubes 44 and 50, respectively, so that slippage of the tubes with respect to the blocks is eliminated.

As shown in FIG. 7, the solenoids 32 and 34 are conventional comprising linearly movable actuators 32a and 34a, respectively, and may be spring biased away from the roller wheel 30. When actuated as shown in FIG. 8, they move towards the roller wheel as indicated by the arrows, and cause the tube blocks 62 to rotate about pins 62b, thus pressing the tubes 44 and 50 into the individual rollers 30b, thus substantially closing their interior surfaces. When the roller wheel is actuated, as indicated by the arrow about the motor shaft 64a in FIG. 8, the rollers move with respect to the tubes, thus producing a peristaltic pumping force. A differential in pressure is thus provided across the ends of the tubes 44 and 50. In the case of tube 44, the positive pressure is used to pump ink from reservoir 36 to the jet 22, not shown in FIG. 8; in the case of the tube 50, a negative pressure is provided to the vicinity of the jet 22, as explained above; any debris, purged ink or other foreign matter may be discharged into the second compartment 48 of the reservoir 36. It will be appreciated that provision of two solenoids to control the two pumps permits the timing of their operation to be individually adjusted and controlled, for fine-tuning of the prime and purge operations such that the initiation and termination of the vacuum at the catcher 46 is independent of the initation and termination of the pumping of ink to the jet 22.

Figure 9:
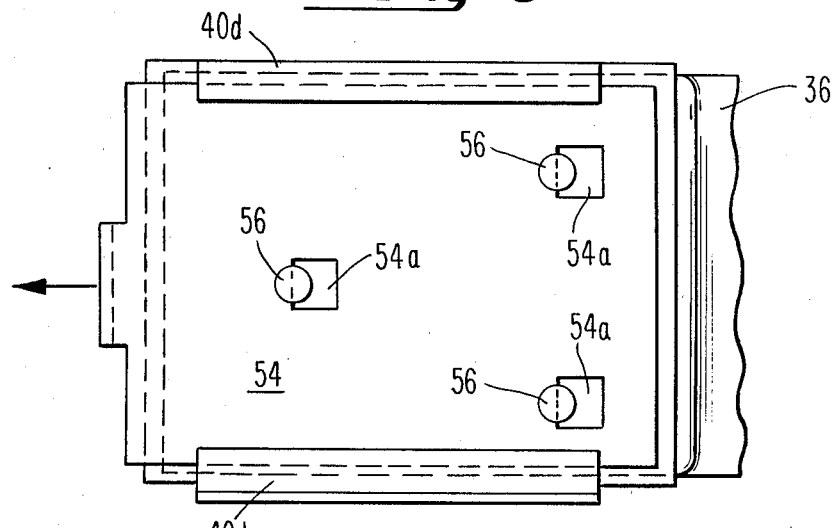
FIG. 9 is a bottom view of the apparatus of the invention showing one way in which the apparatus may be made readily disconnectable and thus simplifying its disposability.

Details of one mounting arrangement for the reservoir 36 is shown in FIG. 9. Three of the notched pins or tubes 56 shown in FIG. 2 are shown interacting with openings 37 of the bracket 54 shown also in FIG. 2. The bracket 54 may in turn interact with the bracket 40 having rolled over ears 40d to hold it so that when the bracket 54 is moved in the direction shown in the arrows in FIG. 9 and FIG. 2, the notched stubs 56 56 formed integrally with the reservoir 36 are disengaged from the openings 57 of the bracket and the entire assembly can be removed for replacement. The electrical connections to the ink jet itself are the only ones required, as the pumps are controlled entirely externally to the disposable portion of the invention by control of the motor 64 and the solenoids 34 and 36, and can be made readily by plug in connectors, contacts in the base of the reservoir 36 mating with ones in the plate 40, or other well-known expedients.

Figure 10:
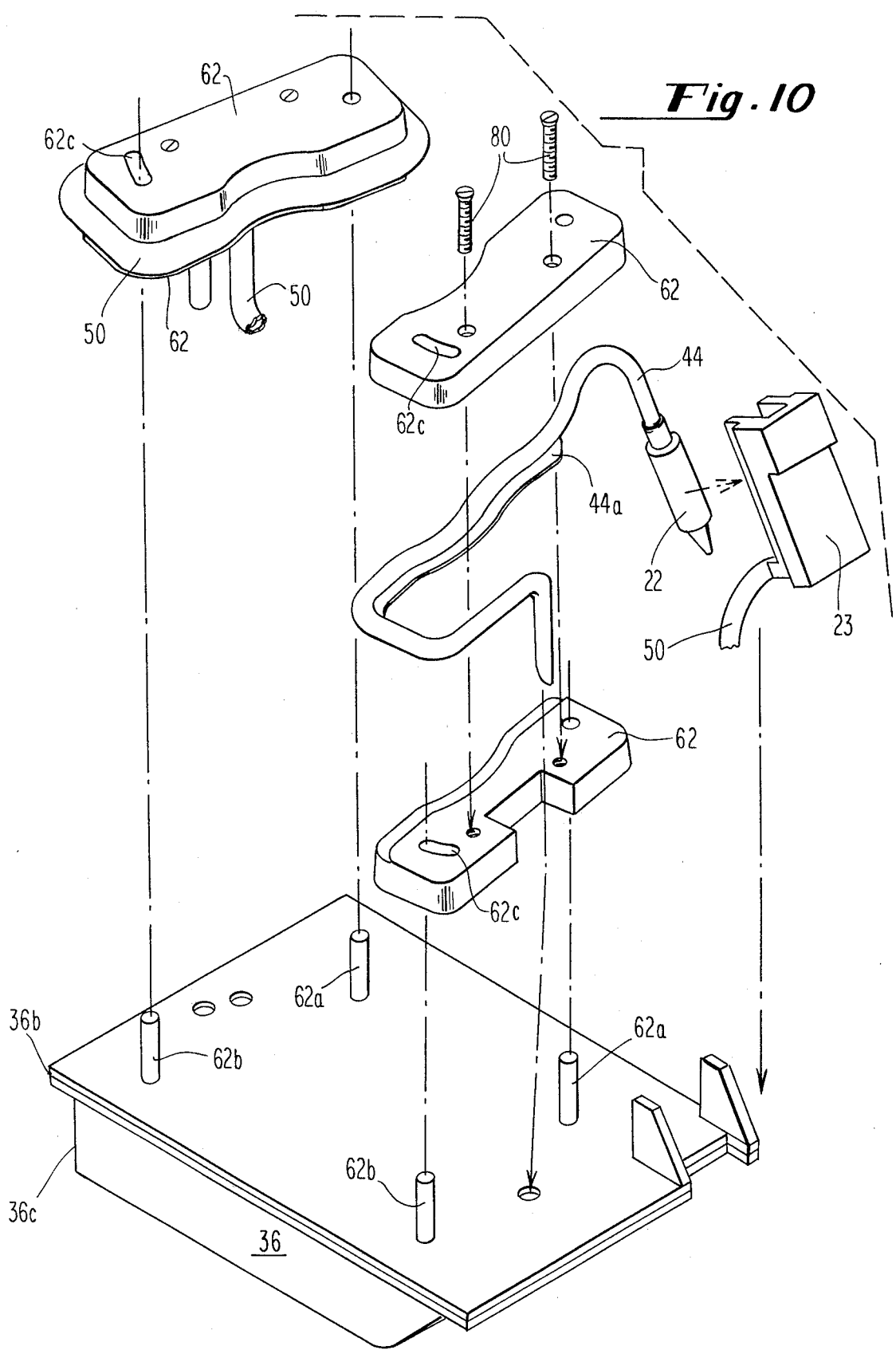
FIG. 10 is an exploded view of the disposable portion of the pump apparatus according to the invention.

Reference will now be simultaneously made to FIGS. 10, 11 and 12, which show the assembly and arrangement of the disposable portion of facsimile apparatus according to the invention, e.g., the disposable reservoir, the vacuum and prime and purge pumps and the ink jet.

FIG. 10 shows an exploded view of this assembly, FIG. 11 a perspective, and FIG. 12 a cross-sectional view. Comparison of these three figures, it is believed, will clearly show the construction of the disposable ink supply apparatus according to the invention.

As shown in FIG. 10, the two tube blocks 62 are each comprised of two portions held together by means of screws 80. In this way, the two portions can between them clamp a rib 44a formed on the tube 44 (or 50a and 50) as discussed above. The blocks pivot about pins 62a which interact with holes formed in the blocks 62. The amount of rotation permitted them is limited by slots 62c interacting with pins 62b formed in the reservoir 36. The reservoir 36 may comprise a top 36b and a bottom 36c, both molded of inexpensive plastic material and bonded together along a peripheral edge. The jet 22 may be carried by a holder 23 which may also be integrally formed in the top 36b of the reservoir and may, as discussed above, comprise a glass tube of capillary dimension encased in a cylinder of piezoelectric material adapted to squeeze the tube upon application of an electrical pulse thereto thus causing the tube to emit a droplet of ink from the orifice of the jet 22 for purposes of printing. FIG. 11 shows the routing of tubes 44 and 50 which carry ink to the jet 22 and supply vacuum to the orifice 46, respectively. They are wrapped around the blocks 62 and clamped, by means of ribs formed integrally therewith as discussed above, and upon energization of the solenoids 32 and 34 are impacted into the roller 30 whereby a peristaltic pumping action is effected. If anything goes amiss with the ink supply system, the entire assembly shown in FIGS. 10-12 can be removed and discarded. The reservoir 36, the tubes 44 and 50, the blocks 62 and the ink jet holder 23 are all made of inexpensive plastic material and can be so designed as to be readily molded, whereby expensive machining operations are eliminated in favor of simple assembly operations. The entire apparatus comprising reservoir 36, tubes 44 and 50, tube blocks 62, ink jet 22 and ink jet holder 23 can all be assembled and filled with ink at a manufacturing location and shipped as a complete unit thus eliminating problems caused by semi-skilled or unskilled personnel attempting to replace, e.g. the reservoir only, without disposing of the pumps, tubes, or jet. It will be appreciated by those skilled in the art that in order to provide reliable ink jet apparatus, it is essential that the connections between the various parts of the system be properly connected, kept clean and not tampered with. By the present invention, such difficulties can be largely eliminated by making the entire assembly unitary and disposable as a unit whereby no adjustment or maintenance by semi-skilled personnel is necessary.

Various details of the preferred embodiment of the invention are disclosed in the aforesaid copending application Ser. No. 203,583 which is incorporated herein by reference.

It will be appreciate that while a preferred embodiment of the invention has been described above, numerous modifications and improvements can be made thereto without departing from the essential scope of the invention which should therefore be not limited by the description given above, but more properly by the following claims.

What is claimed is:

1. In facsimile apparatus of the type comprising ink jet apparatus for producing droplets of ink in response to print commands, said ink jet being supplied with ink from a disposable reservoir, said reservoir comprising means for priming and purging said jet and means for producing subatmospheric pressure in the vicinity of said jet to remove purged material, the improvement comprising said means for priming or purging said jet being of the peristaltic pump type comprising a first resilient tube having a first end and a second end, means for pressing said first tube closed at a point of closure intermediate said ends, and means for moving said point of closure from said first end of said tube towards said second end, and said means for producing subatmospheric pressure being of the peristaltic pump type comprising a second resilient tube having an inlet end and an outlet end, means for pressing said second tube closed at a point of closure near said inlet end, and means for moving said point of closure towards said outlet end.

2. The facsimile apparatus according to claim 1 wherein said tubes are pressed closed against tube block means.

3. The facsimile apparatus according to claim 2 wherein said tubes comprise a rib adapted to be clamped between mating portions of said tube block means whereby the tubes may be held firmly.

4. Facsimile apparatus according to either of claims 1 or 2 wherein said means for pressing said tubes closed comprises roller means.

5. Facsimile apparatus according to claim 1 wherein said disposable reservoir further comprises said ink jet, said ink being supplied with and disposable with said reservoir.

6. Facsimile apparatus comprising ink jet apparatus for ejecting droplets of ink onto a copy medium, means for moving said ink jet apparatus with respect to said copy medium, said ink jet apparatus comprising an ink reservoir for the supply of ink to an ink jet, peristaltic ink supply pump means for priming said ink jet and peristaltic vacuum means for removal of excess ink, wherein said ink supply means and said vacuum means are powered by single motive means stationary with respect to said ink jet apparatus.

7. Apparatus according to claim 6 in which said peristaltic pump means comprise tubes affixed to tube blocks.

8. Apparatus according to claim 7 in which said tubes are adapted to be pressed against said tube blocks by roller means mounted on said motive means.

9. Apparatus according to claim 7 wherein said tubes comprise ribs adapted to be clamped by said tube blocks.

10. Apparatus according to claim 7 wherein said tube blocks are adapted to be pivoted under the action of actuator means.

11. Apparatus as claimed in claim 10 wherein said actuator means comprise solenoid means.

12. Disposable reservoir apparatus for supply of ink to an ink jet, said reservoir comprising first pump means for supply of ink to said ink jet for purging of said jet and second pump means for producing subatmospheric pressure in the vicinity of said jet for removal of any purged material, wherein both said pump means are adapted to be driven by single motive means, wherein said pumps are peristaltic pumps of the type comprising a resilient tube is mounted for compression against a tube block.

13. Apparatus according to claim 12 wherein both said tubes are pressed against tube blocks by single roller means driven by said single motive means.

14. Apparatus according to claim 13 wherein said tube blocks are pivotally mounted and said tubes are carried thereon whereby said tubes may be pressed into said roller means by individually actuable second and third motive means arranged for pivoting said tube blocks.

15. Apparatus according to claim 12 wherein said reservoir further comprises a flexible membrane therein so that the effective capacity of said reservoir diminishes as ink is removed therefrom, and said ink remains bubble free.

16. Apparatus according to claim 15 wherein said reservoir is contained within a substantially rigid container.

17. Apparatus according to claim 16 wherein said pump means for removal of purged material discharges into said container.

18. In facsimile apparatus of the type comprising disposable ink jet means for producing marks upon a copy medium, said ink jet means comprising an ink supply reservoir, first means for pumping ink from said reservoir through said jet to prime and to purge said jet, and second pumping means for producing a vacuum for collecting material purged from said jet the improvement which comprises said first and second pumping means being peristaltic pump means comprising resilient tubes adapted to be pressed closed against tube blocks.

19. Apparatus according to claim 18 wherein said tubes comprise ribs adapted to be clamped between mating portions of said tube blocks.

20. Apparatus according to claim 19 wherein both said tubes are closed by single roller means mounted on motive means.

21. Apparatus according to claim 19 wherein said tube blocks carry said tubes, said tubes being brought into contact with said roller means under the influence of individually controllable actuator means.

22. Apparatus according to claim 21 wherein said actuator means are solenoids.

* * * * *